(12) United States Patent
Tokoro

(10) Patent No.: US 9,481,365 B2
(45) Date of Patent: Nov. 1, 2016

(54) COLLISION PREVENTION CONTROL APPARATUS

(71) Applicant: TOYOTA JIDOSHA KABUSHIKI KAISHA, Toyota-shi, Aichi-ken (JP)

(72) Inventor: Setsuo Tokoro, Miyoshi (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 6 days.

(21) Appl. No.: 14/564,164

(22) Filed: Dec. 9, 2014

(65) Prior Publication Data

US 2015/0217765 A1 Aug. 6, 2015

(30) Foreign Application Priority Data

Feb. 5, 2014 (JP) ................................. 2014-020672

(51) Int. Cl.
| | | |
|---|---|---|
| *B60W 30/09* | (2012.01) | |
| *G01S 13/93* | (2006.01) | |
| *G06K 9/00* | (2006.01) | |
| *G01S 13/86* | (2006.01) | |
| *B60W 50/04* | (2006.01) | |
| *G01S 15/93* | (2006.01) | |
| *G01S 17/93* | (2006.01) | |

(52) U.S. Cl.
CPC ............. *B60W 30/09* (2013.01); *G01S 13/867* (2013.01); *G01S 13/931* (2013.01); *G06K 9/00805* (2013.01); *B60W 50/04* (2013.01); *G01S 15/931* (2013.01); *G01S 17/936* (2013.01); *G01S 2013/9346* (2013.01); *G01S 2013/9353* (2013.01); *G01S 2013/9364* (2013.01); *G01S 2013/9367* (2013.01); *G01S 2013/9375* (2013.01)

(58) Field of Classification Search
CPC ... B60W 30/09; B60W 50/04; G01S 13/867; G01S 13/931; G01S 15/931; G01S 17/936; G01S 2013/9346; G01S 2013/9353; G01S 13/9364; G01S 13/9367; G01S 13/9375; G06K 9/00805
USPC ......... 701/1, 300, 301; 342/27, 28; 348/148, 348/149
See application file for complete search history.

(56) References Cited

U.S. PATENT DOCUMENTS

| | | | | |
|---|---|---|---|---|
| 6,035,053 A | * | 3/2000 | Yoshioka | ........... B60K 31/0008 340/435 |
| 6,037,860 A | * | 3/2000 | Zander | ................. B60W 30/09 307/10.1 |

(Continued)

FOREIGN PATENT DOCUMENTS

| | | |
|---|---|---|
| DE | 102007041121 A1 | 3/2009 |
| DE | 102009006113 A1 | 9/2009 |

(Continued)

*Primary Examiner* — Fadey Jabr
*Assistant Examiner* — Angelina Shudy
(74) *Attorney, Agent, or Firm* — Oliff PLC

(57) ABSTRACT

According to one aspect of the disclosure, a collision prevention control apparatus is provided which includes an image sensor that detects an object near the vehicle; a radar sensor that detects the object near the vehicle; and a controller that, if only one of the sensors, among the image sensor and the radar sensor, detects the object, determines reliability of the other sensor, and changes, based on the determined reliability, a way of performing a collision prevention control for preventing a collision with the object detected by the one of the sensors.

4 Claims, 4 Drawing Sheets

(56) References Cited

U.S. PATENT DOCUMENTS

| | | | |
|---|---|---|---|
| 6,259,992 B1* | 7/2001 | Urai | B60K 31/0008 701/301 |
| 6,301,532 B1* | 10/2001 | Kull | B62D 15/0245 701/301 |
| 6,414,712 B1* | 7/2002 | Wanielik | G01C 21/28 348/118 |
| 6,492,935 B1* | 12/2002 | Higuchi | G01S 13/931 342/54 |
| 8,917,321 B1* | 12/2014 | Sasabuchi | G01S 13/867 340/436 |
| 8,994,581 B1* | 3/2015 | Brown | G01S 13/931 342/127 |
| 9,135,823 B2* | 9/2015 | Takaki | G08G 1/165 |
| 9,248,835 B2* | 2/2016 | Tanzmeister | B60W 30/0956 |
| 2001/0031068 A1* | 10/2001 | Ohta | G01C 3/08 382/103 |
| 2003/0105578 A1* | 6/2003 | Takenaga | B60W 30/16 701/117 |
| 2004/0066285 A1* | 4/2004 | Sekiguchi | B60K 31/0008 340/435 |
| 2004/0189512 A1* | 9/2004 | Takashima | G01S 13/867 342/70 |
| 2005/0083432 A1* | 4/2005 | Honda | H04N 5/232 348/362 |
| 2006/0058931 A1* | 3/2006 | Ariyur | G05D 1/0257 701/23 |
| 2006/0173621 A1* | 8/2006 | Stopczynski | B60W 30/09 701/301 |
| 2006/0274149 A1* | 12/2006 | Yoshizawa | B60R 21/0134 348/148 |
| 2007/0080850 A1 | 4/2007 | Abe et al. | |
| 2007/0168128 A1 | 7/2007 | Tokoro et al. | |
| 2007/0286475 A1 | 12/2007 | Sekiguchi | |
| 2009/0177359 A1* | 7/2009 | Ihara | B60R 21/0134 701/45 |
| 2009/0187343 A1* | 7/2009 | Koch-Groeber | B60K 35/00 701/301 |
| 2010/0225522 A1* | 9/2010 | DeMersseman | G01S 7/03 342/72 |
| 2010/0228419 A1* | 9/2010 | Lee | B60W 30/0953 701/25 |
| 2011/0184617 A1* | 7/2011 | Hegemann | G08G 1/166 701/70 |
| 2012/0035846 A1* | 2/2012 | Sakamoto | B60T 8/17558 701/301 |
| 2012/0116665 A1* | 5/2012 | Aoki | B60T 8/17558 701/301 |
| 2012/0313806 A1* | 12/2012 | Katoh | G01S 13/931 342/52 |
| 2013/0151135 A1* | 6/2013 | Aubrey | G08G 1/00 701/118 |
| 2014/0032093 A1* | 1/2014 | Mills | B60W 40/107 701/301 |
| 2014/0139369 A1* | 5/2014 | Baba | G01S 13/867 342/146 |
| 2014/0142837 A1* | 5/2014 | Takaki | G08G 1/166 701/301 |
| 2014/0343750 A1* | 11/2014 | Minemura | B60W 50/04 701/1 |
| 2014/0368668 A1* | 12/2014 | Sasabuchi | G01S 13/867 348/187 |
| 2015/0109164 A1* | 4/2015 | Takaki | G01S 13/867 342/27 |
| 2015/0112570 A1* | 4/2015 | Schmudderich | G01S 13/931 701/93 |
| 2015/0183431 A1* | 7/2015 | Nanami | B60W 40/04 701/301 |
| 2015/0206435 A1* | 7/2015 | Ouchi | G08G 1/166 340/903 |
| 2015/0219761 A1* | 8/2015 | Inomata | G08G 1/166 701/301 |
| 2015/0234044 A1* | 8/2015 | Ouchi | G01S 13/93 342/27 |

FOREIGN PATENT DOCUMENTS

| | | |
|---|---|---|
| JP | A-2002-225656 | 8/2002 |
| JP | A-2005-84034 | 3/2005 |
| JP | 2005-202878 A | 7/2005 |
| JP | A-2005-239114 | 9/2005 |
| JP | 2007-310741 A | 11/2007 |
| JP | 2012-043364 A | 3/2012 |
| JP | 2013-101485 A | 5/2013 |

* cited by examiner

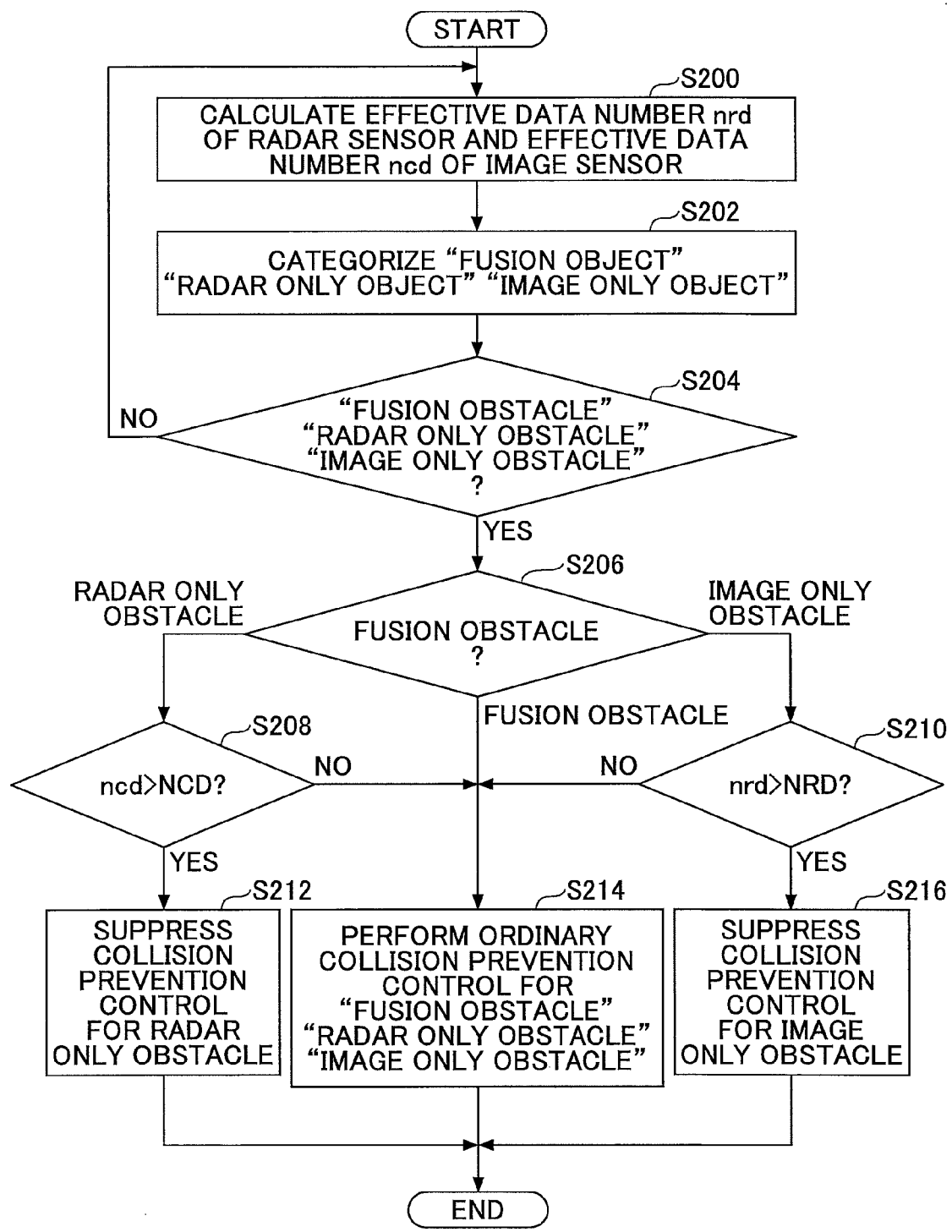

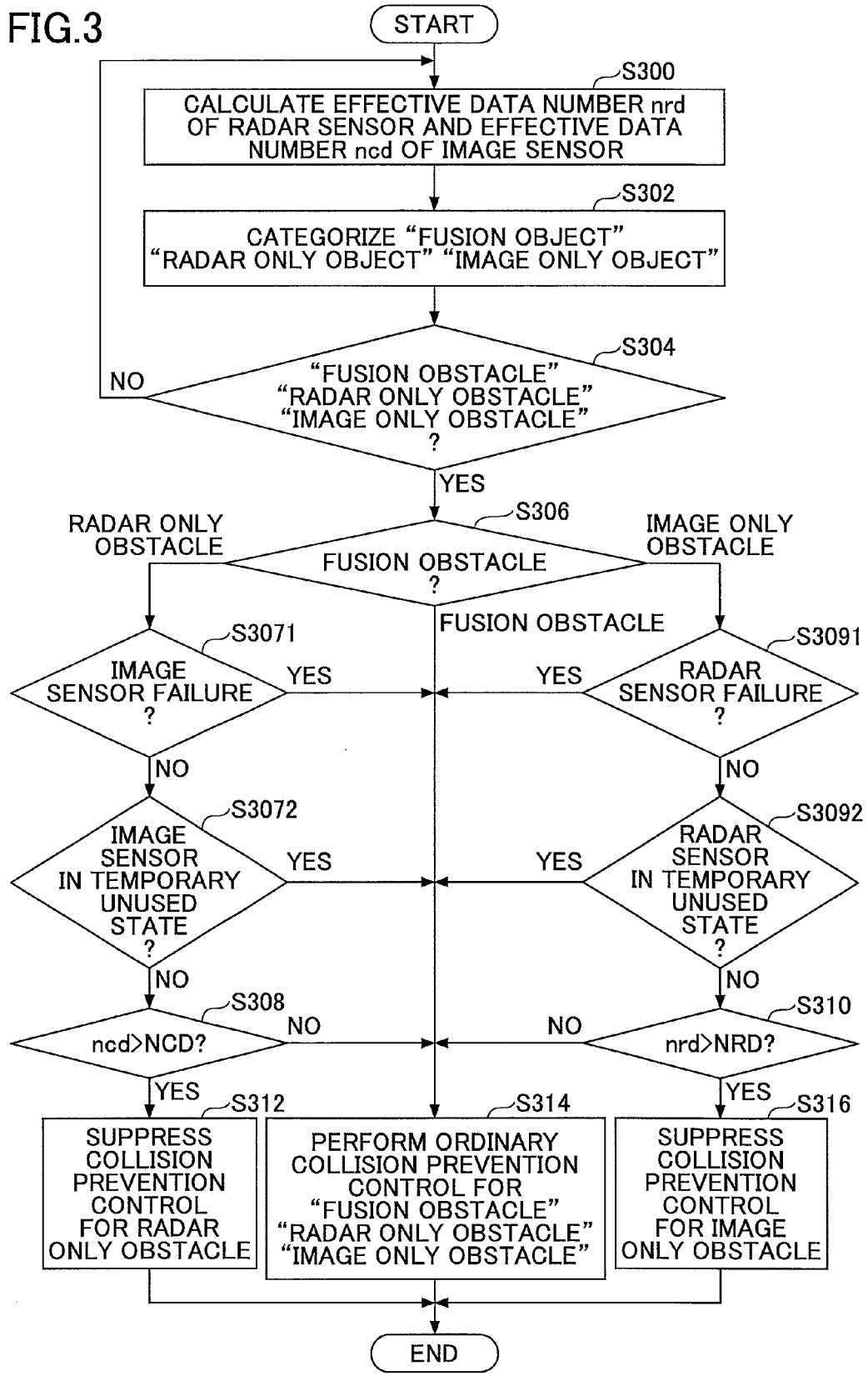

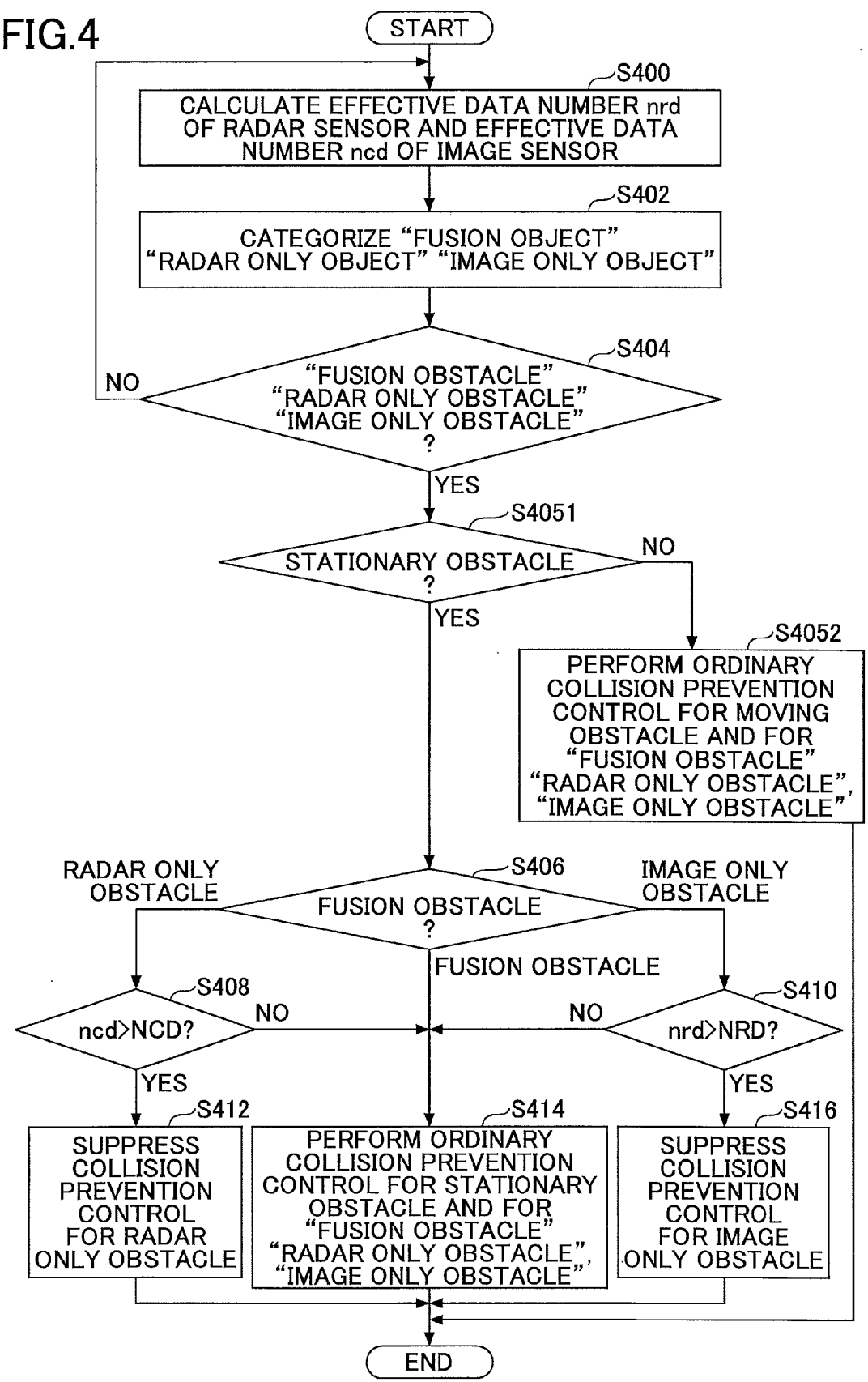

COLLISION PREVENTION CONTROL APPARATUS

FIELD

The disclosure is related to a collision prevention control apparatus.

BACKGROUND

Japanese Laid-open Patent Publication No. 2005-239114 (Patent Document 1) discloses a traveling support device in which an obstacle detection result by radar (millimeter wave) and the obstacle detection result by the image recognition are collated to include a case detected by both of the results and cases detected by respective ones of the results, and a starting condition of the traveling support control is changed according to the included results.

However, according to the configuration disclosed in Patent Document 1 described above, a control condition of the traveling support control is not determined, if only one of the image sensor and the radar sensor detects the obstacle, based on the reliability of the other sensor.

Therefore, according to the disclosure, it an object to provide a collision prevention control apparatus that, if only one of an image sensor and a radar sensor detects an object, can consider reliability of the other sensor to perform collision prevention control related to the object.

SUMMARY

According to one aspect of the disclosure, a collision prevention control apparatus is provided, comprising:
an image sensor that detects an object near a vehicle;
a radar sensor that detects the object near the vehicle; and
a controller that, if only one of the sensors, among the image sensor and the radar sensor, detects the object, determines reliability of the other sensor, and changes, based on the determined reliability, a way of performing a collision prevention control for preventing a collision with the object detected by the one of the sensors.

BRIEF DESCRIPTION OF DRAWINGS

FIG. 2 is an example of a flowchart of a process executed by a vehicle control ECU 10.

FIG. 3 is another example of a flowchart of the process executed by the vehicle control ECU 10.

FIG. 4 is another example of a flowchart of the process executed by the vehicle control ECU 10.

DESCRIPTION OF EMBODIMENTS

Figure 1:
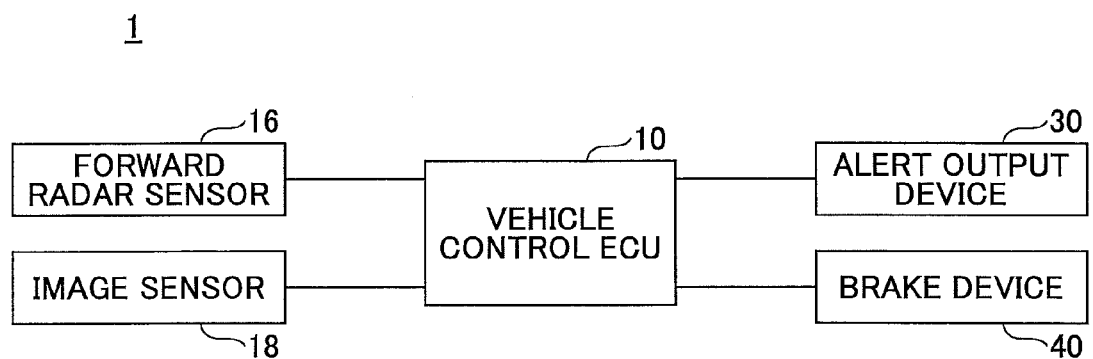
FIG. 1 is a diagram illustrating a configuration of a collision prevention control apparatus 1 according to an embodiment.

In the following, embodiments will be described with reference to the accompanying drawings.

FIG. 1 is a diagram illustrating a configuration of a collision prevention control apparatus 1 according to an embodiment. It is noted that connection ways between elements in FIG. 1 are arbitrary. For example, the connection ways may include a connection via a bus such as a CAN (controller area network), etc., an indirect connection via another ECU, etc., a direct connection, and a connection that enables wireless communication.

The collision prevention control apparatus 1 includes a vehicle control ECU (Electronic Control Unit) 10. The vehicle control ECU 10 may be formed by a processor that includes a CPU. Functions of the vehicle control ECU 10 (including functions described hereinafter) may be implemented by any hardware, any software, any firmware or any combination thereof. For example, any part of or all the functions of the vehicle control ECU 10 may be implemented by an ASIC (application-specific integrated circuit), a FPGA (Field Programmable Gate Array) or a DSP (digital signal processor). Further, the vehicle control ECU 10 may be implemented by a plurality of processors.

The vehicle control ECU 10 is connected to a forward radar sensor 16 and an image sensor 18.

The forward radar sensor 16 detects a state (object information) of an object (a preceding vehicle, etc., for example) in front of a host vehicle using an electric wave (millimeter wave, for example), a light wave (laser, for example) or an ultrasonic wave as a detection wave. The forward radar sensor 16 detects information which represents a relationship between the object and the host vehicle such as a relative speed, a relative distance and a direction (a lateral position) with respect to the host vehicle, for example, at a predetermined cycle. It is noted that if the forward radar sensor 16 is a millimeter wave radar sensor, the millimeter wave radar sensor may be of an electronic controlled scanning type, for example. In this case, the relative speed of the object is detected using a Doppler frequency (frequency shift) of the electric wave, the relative distance of the object is detected using a delayed time of the reflection wave, and the direction of the object is detected based on a shift difference of the received waves between a plurality of reception antennas. The object information thus obtained is transmitted to the vehicle control ECU 10 at a predetermined cycle. It is noted that any functions of the forward radar sensor 16 (a function of calculating a position of the object, for example) may be implemented by the vehicle control ECU 10.

The image sensor includes a camera, which includes imaging elements such as CCDs (charge-coupled device), CMOSs (complementary metal oxide semiconductor), etc., and an image processor to recognize the state of the object. A detection area of the image sensor 18 (i.e., an imaging area or an image processing area of the camera) is in front of the host vehicle, as is the case with the detection area of the forward radar sensor 16. The detection area of the image sensor 18 is partially or completely overlapped with the detection area of the forward radar sensor 16. In other words, the image sensor 18 and the forward radar sensor 16 include a common detection region.

The camera of the image sensor 18 may be a monocular camera or a stereo camera. The image sensor 18 detects, based on an image recognition result, the information which represents a relationship between the object and the host vehicle such as a relative speed and position information of the object with respect to the host vehicle, for example, at a predetermined cycle. The position information of the object includes information related to the position (distance) of the object in the back-and-forth direction of the host vehicle, and information related to the lateral position of the object in the lateral direction (width direction). The lateral position of the object may be calculated based on a center position of a pixel group related to the object in the lateral direction. Alternatively, the lateral position of the object may be calculated as a range between a left end lateral position and a right end lateral position. The object information thus obtained with the image sensor 18 may be transmitted to the vehicle control ECU 10 at a predetermined cycle. It is noted that the image processing function of the image processor (a function of calculating a position of the object, for example) may be implemented by the vehicle control ECU 10.

The vehicle control ECU 10 is connected to an alert output device 30 and a brake device 40. The vehicle control ECU 10 performs collision prevention control via the alert output device 30 and/or the brake device 40. The collision prevention control includes an alert output control implemented by using the alert output device 30 and an automatic brake control implemented by using the brake device 40.

The alert output device 30 includes a display device such as a meter, etc., or an audio generation device such as a speaker, a buzzer, etc., for example.

The brake device 40 generates a brake force at the respective wheels of the vehicle. The brake device 40 may include actuators and valves for controlling wheel cylinder pressures. The oil hydraulic circuit of the brake device 40 may have such a configuration that it can increase the wheel cylinder pressures regardless of a brake pedal operation amount by a driver (i.e., a configuration that can implement automatic brake control). Typically, the oil hydraulic circuit of the brake apparatus may include a high-pressure source (a pump for generating the high-pressure oil and an accumulator, for example) other than a master cylinder. Further, such an oil hydraulic circuit that is typically used in a brake-by-wire system such as an ECB (Electric Control Braking system) may be adapted.

FIG. 2 is an example of a flowchart of a process executed by a vehicle control ECU 10. The process routine illustrated in FIG. 2 may be initiated, during the traveling of the vehicle, if an object is detected in the common detection region of the forward radar sensor 16 and the image sensor 18 and by the forward radar sensor 16 and/or the image sensor 18.

In step S200, the vehicle control ECU 10 calculates reliability of the forward radar sensor 16 and reliability of the image sensor 18. Here, the vehicle control ECU 10 calculates, as examples of the reliability of the forward radar sensor 16 and the reliability of the image sensor 18, a number of items of effective data nrd (referred to as "effective data number nrd", hereinafter) of the forward radar sensor 16 and a number of items of effective data ncd (referred to as "effective data number ncd", hereinafter) of the image sensor 18.

The effective data of the forward radar sensor 16 is data whose reception level of a reception wave related to a radar transmission wave is greater than or equal to a predetermined value, for example. In other words, the effective data of the forward radar sensor 16 is data of reflection points, among the data of the reflection points received by the forward radar sensor 16, whose reception level of the reception wave related to a radar transmission wave is greater than or equal to a predetermined value and for which the distance information can be calculated. In this case, the effective data number nrd of the forward radar sensor 16 corresponds to a number of the reflection points (i.e., a number of peaks of the reception wave) in the detection area of the forward radar sensor 16 as a whole.

The effective data of the image sensor 18 is data (i.e., edge data) whose differential value in a differential image (differential in a concentration between neighboring pixels) of the image data is greater than or equal to a predetermined value, for example. If the camera of the image sensor 18 is a stereo camera, the effective data may be data of points (pixels) for which parallaxes (i.e., distances), which are greater than or equal to a predetermined value, are detected. Further, if the camera of the image sensor 18 is a monocular camera, the effective data may be data of points for which optical flows can be determined by determining corresponding points between images obtained at different times. In these cases, the effective data number ncd of the image sensor 18 corresponds to the number of these points in the image as a whole.

In step S202, the vehicle control ECU 10 categorizes the detected objects into three types, "a fusion object", "a radar only object" and "an image only object", based on the object information obtained from the forward radar sensor 16 and/or the image sensor 18. The fusion object is an object (the identical object) that can be detected by the forward radar sensor 16 and the image sensor 18. The radar only object is an object that can be detected by only the forward radar sensor 16, among the forward radar sensor 16 and the image sensor 18. The image only object is an object that can be detected by only the image sensor 18, among the forward radar sensor 16 and the image sensor 18.

In step S204, the vehicle control ECU 10 determines whether the detected object is a target for which the collision prevention control is to be performed, that is to say, an obstacle whose probability of collision with the host vehicle is high, based on the object information from the forward radar sensor 16 and/or the image sensor 18. Various ways of determining whether the detected object is an obstacle are known in a field of pre-crash safety and an arbitrary way may be used. For example, the vehicle control ECU 10 may calculate a TTC (Time to Collision) before the collision with the detected object, and determine that the detected object is an obstacle if the candidate TTC is less than a predetermined value (1 s, for example). Then, the lateral position of the object may be considered. For example, if the object is located within a predetermined width with respect to the traveling direction of the host vehicle, it may be determined that the detected object is an obstacle. It is noted that TTC may be derived by dividing the relative distance to the object by the relative speed with respect to the object.

In step S204, if the vehicle control ECU 10 determines that the detected object is an obstacle, the vehicle control ECU 10 categorizes the obstacle into "a fusion obstacle", "a radar only obstacle" or "an image only obstacle" to go to step S206. It is noted that this categorization is based on the categorization result of step S204. For example, if the detected object is the fusion object and determined as an obstacle, the detected object is categorized as a fusion obstacle. On the other hand, if it is determined that the detected object is not an obstacle, the process may return step S200 to repeat the process from step S200 at the next process cycle.

In step S206, the vehicle control ECU 10 determines the categorization result of step S204 to go to step S208, S210 or S214 according to the categorization result. Specifically, in the case of the fusion obstacle, the process goes to step S214; in the case of the radar alone obstacle, the process goes to step S208; and in the case of the image alone obstacle, the process goes to step S210.

In step S208, the vehicle control ECU 10 determines whether the effective data number ncd of the image sensor 18 is greater than or equal to a predetermined threshold NCD. The predetermined threshold NCD corresponds to a lower limit of the effective data number ncd at which it can be determined that the reliability of the image sensor 18 is high. The predetermined threshold NCD may be adapted based on experimental data, etc. If the effective data number ncd of the image sensor 18 is greater than or equal to the predetermined value NCD, the process goes to step 212, otherwise the process goes to step 214.

In step S210, the vehicle control ECU 10 determines whether the effective data number nrd of the forward radar sensor 16 is greater than or equal to a predetermined threshold NRD. The predetermined threshold NRD corresponds to a lower limit of the effective data number nrd at which it can be determined that the reliability of the forward radar sensor 16 is high. The predetermined threshold NRD may be adapted based on experimental data, etc. If the effective data number nrd of the forward radar sensor 16 is greater than or equal to a predetermined threshold NRD, the process goes to step 216, otherwise the process goes to step 214.

In step S212, the vehicle control ECU 10 performs the collision prevention control for the radar only obstacle based on the obstacle information from the forward radar sensor 16 such that a collision prevention capability by the collision prevention control is reduced. In other words, the collision prevention capability is reduced with respect to the collision prevention capability in the case of an ordinary collision prevention control for the radar only obstacle (see step S214). The way of reducing the collision prevention capability may be arbitrary. For example, the reduction of the collision prevention capability may be implemented by delaying a start timing of the collision prevention control, making a control amount (the brake force at the time of the automatic brake control) at the time of execution of the collision prevention control small, or changing a content of the collision prevention control. Further, for example, according to the ordinary collision prevention control, once the automatic brake control is performed, the automatic brake control operated state continues until the vehicle stops (but the driver may cancel it), while, according to the reduction of the collision prevention capability, even if the automatic brake control is performed, the automatic brake control operated state may be canceled if the object is not detected subsequently based on the object information from the forward radar sensor 16. Further, for example, according to the ordinary collision prevention control, the alert output and the automatic brake control are performed, while, according to the reduction of the collision prevention capability, only the alert output, or only the alert output and a PBA (Pre-crash Brake Assist) may be performed. The PBA is a control for assisting a brake operation of the driver. For example, the PBA is a control that automatically increases the pressed amount of the brake pedal of the driver.

In step S214, the vehicle control ECU 10 performs the ordinary collision prevention control based on the object information obtained from the forward radar sensor 16 and/or the image sensor 18. Specifically, the vehicle control ECU 10 performs the ordinary collision prevention control for the radar only obstacle if the obstacle is the radar only obstacle (see "NO" in step S208), performs the ordinary collision prevention control for the image only obstacle if the obstacle is the image only obstacle (see "NO" in step S210), and performs the ordinary collision prevention control for the fusion obstacle if the obstacle is the fusion obstacle. The ordinary collision prevention control for the radar only obstacle is performed based on the obstacle information from the forward radar sensor 16, the ordinary collision prevention control for the image only obstacle is performed based on the obstacle information from the image sensor 18, and the ordinary collision prevention control for the fusion obstacle is performed based on the obstacle information from the forward radar sensor 16 and the image sensor 18. The ordinary collision prevention control for the radar only obstacle and the ordinary collision prevention control for the image only obstacle may be the same as the ordinary collision prevention control for the fusion obstacle, or may have the reduced collision prevention capability with respect to the ordinary collision prevention control for the fusion obstacle. The way of reducing the collision prevention capability is as described with reference to the process of step S212 but differs in the degree of the reduction. It is noted that the ordinary collision prevention control for the radar only obstacle, the ordinary collision prevention control for the image only obstacle, and the ordinary collision prevention control for the fusion obstacle may differ in operation conditions, contents, etc., due to the fact that the object information available is different, respectively. For example, with respect to the ordinary collision prevention control for the radar only obstacle, the lateral width of the object is not detected by the forward radar sensor 16, and thus the lateral width of the object cannot be considered to perform the control. In contrast, with respect to the ordinary collision prevention control for the image only obstacle, and the ordinary collision prevention control for the fusion obstacle, such a lateral width of the object can be considered to perform the control. On the other hand, there may be a case where the accuracy of the object information of the image sensor 18 is worse than that of the forward radar sensor 16. Thus, the ordinary collision prevention control for the image only obstacle may differ from the ordinary collision prevention control for the radar only obstacle and the ordinary collision prevention control for the fusion obstacle in that a starting timing of the control is delayed or the automatic brake is not operated.

In step S216, the vehicle control ECU 10 performs the collision prevention control for the image only obstacle based on the obstacle information from the image sensor 18 such that the prevention capability by the collision prevention control is reduced. The way of reducing the collision prevention capability is as described with reference to the process of step S212.

There may be a case where the forward radar sensor 16 detects iron plates for construction, steps on the road, etc., as an object. In contrast, the probability that the image sensor 18 detects such steps on the road as an object is low, because the image sensor 18 can recognize a height and a pattern of the object. On the other hand, there may be a case where the image sensor 18 erroneously detects complicated patterns on the road (grid patterns, for example) as a 3D object, and erroneously detects a pattern that is similar to a pedestrian, as a pedestrian. In contrast, this error does not hold true for the forward radar sensor 16. Thus, according to the process illustrated in FIG. 2, the ordinary collision prevention control is performed if the same object is detected by the forward radar sensor 16 and the image sensor 18, so that the collision prevention control can be performed with high reliability.

However, the collision prevention control is suppressed evenly if the object is detected by only one of the forward radar sensor 16 and the image sensor 18, and the collision prevention control may be suppressed at unnecessary scenes. For example, the object may not be detected by the image sensor 18 even if the object really exists, when sun light is received directly by the image sensor 18 or the light is insufficient in a dark circumstance. Further, the object may not be detected by the forward radar sensor 16 even if the object really exists, when a transmission coefficient of the electrical radiation is reduced due to splashes (sleet, etc.) on a front surface of the sensor. In these cases, if the collision prevention control is suppressed evenly, the collision prevention control may be suppressed even if the object really exists.

According to the process illustrated in FIG. 2, if the object is detected by only one of the forward radar sensor 16 and the image sensor 18, the reliability of the other sensor is determined in step S208 and step S210, and a way of performing the collision prevention control (collision prevention capability) is changed based on the determined reliability. With this arrangement, if the object is detected by only one of the forward radar sensor 16 and the image sensor 18, the collision prevention control with an appropriate collision prevention capability can be performed.

Specifically, for example, it can be determined that the reliability of the image sensor 18 is high if the effective data number ncd of the image sensor 18 is greater than the predetermined threshold NCD, even if the obstacle is the radar only obstacle. The probability that the radar only obstacle is not a 3D object in reality is high, because the radar only obstacle is not detected by the reliable image sensor 18. Thus, in this case, the collision prevention control for the radar only obstacle is suppressed (see step S212). On the other hand, if the effective data number ncd of the image sensor 18 is less than or equal to the predetermined threshold NCD, the probability that the object is not detected temporarily by the image sensor 18 due to the backlight, the dark circumstance, etc., is high. In other words, it is not always a case that "the probability that the object exists is low because of the fact that the image sensor 18 does not detect the object". Thus, in this case, the ordinary collision prevention control for the radar only obstacle is performed (see step S214).

Similarly, the reliability of the forward radar sensor 16 is high if the effective data number of nrd the forward radar sensor 16 is greater than the predetermined threshold NRD even if the obstacle is the image only obstacle. The probability that the image only obstacle is not a 3D object in reality is high, because the image only obstacle is not detected by the reliable forward radar sensor 16. Thus, in this case, the collision prevention control for the image only obstacle is suppressed (see step S216). On the other hand, if the effective data number nrd of the forward radar sensor 16 is less than or equal to the predetermined threshold NRD, the probability that the object is not detected temporarily by the forward radar sensor 16 due to the splashes (sleet, etc.), etc., is high. In other words, it is not always a case that "the probability that the object exists is low because of the fact that the forward radar sensor 16 does not detect the object". Thus, in this case, the ordinary collision prevention control for the image only obstacle is performed (see step S214).

FIG. 3 is another example of a flowchart of the process executed by the vehicle control ECU 10. The process illustrated in FIG. 3 differs from the process illustrated in FIG. 2 in that processes of steps S3071, S3072, S3091 and S3092 are added. Processes of steps S300 through S306, and S308 through S316 may be the same as the processes of steps S200 through S206, and S208 through S216 illustrated in FIG. 2, respectively.

In step 3071, it is determined whether the image sensor 18 has a failure. There are various ways of determining the failure of the image sensor 18, and an arbitrary way may be used. If the image sensor 18 has a failure, the process goes to step S314, otherwise the process goes to step S3072. It is noted that, if the image sensor 18 has a failure, a radar-only-mode may be formed as a failsafe mode in which the collision prevention control is performed by using only the object information from the forward radar sensor 16.

In step 3072, it is determined whether the image sensor 18 is in a temporary unused state. The temporary unused state of the image sensor 18 may be formed if backlight due to the sun, high beams of an oncoming vehicle, rain drops on a front glass (detected by a rain sensor), a rainy state, or a foreign substance on the front glass, etc., is detected. If the image sensor 18 is in the temporary unused state, the process goes to step S314, otherwise the process goes to step S308. It is noted that, similarly, if the image sensor 18 is in the temporary unused state, the radar-only-mode may be formed as a failsafe mode in which the collision prevention control is performed by using only the object information from the forward radar sensor 16.

In step 3091, it is determined whether the forward radar sensor 16 has a failure. There are various ways of determining the failure of the forward radar sensor 16, and an arbitrary way may be used. If the forward radar sensor 16 has a failure, the process goes to step S314, otherwise the process goes to step S3092. It is noted that, if the forward radar sensor 16 has a failure, an image-only-mode may be formed as a failsafe mode in which the collision prevention control is performed by using only the object information from the image sensor 18.

In step 3092, it is determined whether the forward radar sensor 16 in a temporary unused state. The temporary unused state of the forward radar sensor 16 may be formed if the splashes, or a foreign substance on a front cover of the forward radar sensor 16, etc., is detected. If the forward radar sensor 16 is in the temporary unused state, the process goes to step S314, otherwise the process goes to step S310. It is noted that, similarly, if the forward radar sensor 16 is in the temporary unused state, the image-only-mode may be formed as a failsafe mode in which the collision prevention control is performed by using only the object information from the image sensor 18.

According to the process illustrated in FIG. 3, the same effects as the process illustrated in FIG. 2 can be obtained.

FIG. 4 is another example of a flowchart of the process executed by the vehicle control ECU 10. The process illustrated in FIG. 4 differs from the process illustrated in FIG. 2 in that processes of steps S4051 and S4052 are added. Processes of steps S400 through S404, S406 through S412, and S416 may be the same as the processes of steps S200 through S204, S206 through S212, and S216 illustrated in FIG. 2, respectively.

In step S4051, it is determined whether the obstacle is a stationary obstacle. Whether the obstacle is a stationary obstacle may be determined based on a vehicle speed of the host vehicle or the object information (relative speed of the obstacle). If the obstacle is a stationary obstacle, the process goes to step S406, otherwise (i.e., in the case of a moving obstacle) the process goes to step S4052.

In step S4052, the vehicle control ECU 10 performs the ordinary collision prevention control for the moving obstacle based on the object information obtained from the forward radar sensor 16 and/or the image sensor 18. The ordinary collision prevention control may differ between the case where the obstacle is the radar only obstacle, the case where the obstacle is the image only obstacle, and the case where the obstacle is the fusion obstacle. It is noted that the ordinary collision prevention control for the moving obstacle may differ between the case where the moving obstacle is the oncoming vehicle and the case where the moving obstacle is the preceding vehicle.

In step S414, the vehicle control ECU 10 performs the ordinary collision prevention control for the stationary obstacle based on the object information obtained from the forward radar sensor 16 and/or the image sensor 18.

According to the process illustrated in FIG. 4, the same effects as the process illustrated in FIG. 2 can be obtained. According to the process illustrated in FIG. 4, the same process as illustrated in FIG. 2 is performed only if the obstacle is the stationary obstacle. Thus, according to the process illustrated in FIG. 4, the reduction degree of the collision prevention control for the image only obstacle and the radar only obstacle is changed only for the stationary object that easily causes erroneous detections by the forward radar sensor 16 and the image sensor 18. This is because the erroneous detections by the forward radar sensor 16 easily occur for the stationary object such as steps on the road, etc., and the erroneous detections by the image sensor 18 easily occur for the stationary object such as patterns on the road, etc., as described above.

Further, according to the process illustrated in FIG. 4, because it is determined whether the obstacle is a stationary obstacle, the ordinary collision prevention control can be performed in an appropriate manner (a start timing, for example) according to whether the obstacle is a stationary obstacle or not.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiment(s) of the present inventions have been described in detail, it should be understood that the various changes, substitutions, and alterations could be made hereto without departing from the spirit and scope of the invention. Further, all or part of the components of the embodiments described above can be combined.

The present application is based on Japanese Priority Application No. 2014-020672, filed on Feb. 5, 2014, the entire contents of which are hereby incorporated by reference.

What is claimed is:

1. A collision prevention control apparatus, comprising:
    an image sensor that detects an object near a vehicle;
    a radar sensor that detects the object near the vehicle; and
    a controller that, when only a first one of the sensors, among the image sensor and the radar sensor, detects the object, determines a reliability of data obtained by a second one of the sensors, and changes, based on the determined reliability of the data obtained by the second one of the sensors, a performance of a collision prevention control for preventing a collision with the object detected by the first one of the sensors, wherein
    the controller changes the performance of the collision prevention control such that a prevention capability by the collision prevention control is reduced as the determined reliability of the data obtained by the second one of the sensors increases.

2. The collision prevention control apparatus of claim 1, wherein the controller determines the reliability of the data obtained by the second one of the sensors based on a number of items of effective data obtained by the second one of the sensors, and
    the number of items of effective data corresponds to a number of reflection points whose reception levels are higher than a predetermined strength, when the second one of the sensors is the radar sensor, and corresponds to a number of pixels for which edges or parallaxes are detected or optical flows can be determined, when the second one of the sensors is the image sensor.

3. The collision prevention control apparatus of claim 1, wherein, when only one of the image sensor and the radar sensor detects the object, the controller changes the performance of the collision prevention control such that the prevention capability by the collision prevention control is reduced compared to a case where both the image sensor and the radar sensor detect the object.

4. The collision prevention control apparatus of claim 1, wherein, when only one of the image sensor and the radar sensor detects the object that is stationary, the controller changes, based on the determined reliability of the data obtained by the second one of the sensors, the performance of the collision prevention control for preventing the collision with the object that is stationary.

* * * * *